United States Patent [19]

von der Heide et al.

[11] Patent Number: 4,497,002
[45] Date of Patent: Jan. 29, 1985

[54] METHOD OF AND APPARATUS FOR DRIVING A DISK STORAGE

[75] Inventors: Johann von der Heide, Mönchweiler; Bernhard Schuh, Georgen, both of Fed. Rep. of Germany

[73] Assignee: Papst-Motoren GmbH & Co. KG, St. Georgen, Fed. Rep. of Germany

[21] Appl. No.: 363,135

[22] Filed: Mar. 29, 1982

Related U.S. Application Data

[63] Continuation-in-part of Ser. No. 095,536, Nov. 19, 1979, abandoned.

[30] Foreign Application Priority Data

Apr. 28, 1979 [DE] Fed. Rep. of Germany ....... 2917385

[51] Int. Cl.³ .............................................. G11B 5/012
[52] U.S. Cl. ...................................... 360/97; 360/86; 360/137; 188/163
[58] Field of Search .................................. 360/97–99, 360/86, 103, 107; 188/159, 161, 163; 242/156, 242/156.2; 346/137; 274/39 A

[56] References Cited

U.S. PATENT DOCUMENTS

| | | | |
|---|---|---|---|
| 3,518,651 | 6/1970 | Keeney | 360/97 X |
| 3,878,922 | 4/1975 | McCarthy | 188/163 |
| 4,099,601 | 7/1978 | Pittman | 188/163 |
| 4,139,874 | 2/1979 | Shiraishi | 360/86 |
| 4,337,491 | 6/1982 | Hasler et al. | 360/97 |

FOREIGN PATENT DOCUMENTS 2051145 4/1972 Fed. Rep. of Germany .

Primary Examiner—John H. Wolff
Attorney, Agent, or Firm—Theodore J. Koss, Jr.

[57] ABSTRACT

To prevent damage to magnetic storage disks from sliding of the magnetic heads over the disk surface during running-out of the disk to a stop, the disk is positively braked when its drive is de-energized, so as to shorten the running-out time.

7 Claims, 8 Drawing Figures $t_1 \approx t_A$ in case of Fig. 1A $t_1 < t_A$ in case of Fig. 3

METHOD OF AND APPARATUS FOR DRIVING A DISK STORAGE

CROSS-REFERENCE TO A RELATED APPLICATION

This application is a continuation-in-part application of the U.S. application Ser. No. 095,536 filed Nov. 19, 1979, now abandoned.

BACKGROUND OF THE INVENTION

This invention relates to disk storages.

More particularly, the invention relates to a method of driving disk storage.

Still more specifically, the invention relates to a method of driving disk storage in such a manner as to eliminate, or at least minimize, scratching of the disk surface by the reading and/or recording heads of the device. The invention also relates to an apparatus for carrying out the method.

In disk storage devices, information is magnetically recorded on high-speed rotating disks and is subsequently read out while the disk is rotating. Recording and read-out are effected by magnetic recording and reading heads, respectively. During the actual recording or read-out operation, i.e. when the disk rotates at high speed, these heads "float" on a thin layer of air which is entrained by and above the disk surface; due to the presence of this layer, the heads do not contact the disk surface under those conditions.

However, the development of the air layer or cushion is a function of the disk speed. Before the disk reaches a sufficient speed, or when it drops below this speed, the air layer does not exist and the reading or recording heads can contact the disk surface which they can scratch or otherwise damage and/or on which they can deposit dirt or other contaminants. This can be counteracted by reducing the number of disk revolutions at start-up (i.e. before the disk is up to speed) and at run-out (i.e. before the disk stands still) to the maximum possible extent.

The solution to this problem for the start-up phase is not particularly vexing, since appropriate motor selection assures that the disk comes up to speed very rapidly. The run-out phase, however, presents much more of a problem because both the drive and the disk support have a substantial amount of inertia, so that a relatively long time elapses before the disk comes to a full stop. During this time, of course, the head or heads ride on the disk in contact with its surface and can scratch or otherwise damage it.

The U.S. Pat. No. 4,101,945 shows a drive spindle assembly for disk file as known per se in this field.

SUMMARY OF THE INVENTION

It is an object of the present invention to overcome the disadvantages of the prior art.

A more particular object is to provide an improved method of driving a disk storage in such a manner that the contact time between the head or heads and the disk surface at run-out is reduced.

A concomitant object of the invention is to provide an apparatus for carrying out the method of the invention.

In keeping with the above objects, and with others which will become apparent hereafter, one aspect of the invention resides in a method comprising the steps of terminating the drive; and applying a positive braking force to the rotating storage disks especially before contact occurs between a disc and its relevant cooperating head, so as to shorten the time which elapses between the step of terminiating and a full stop of the disk storage, whereby the contact time between a disk of the disk storage and a magnetic head thereof is correspondingly reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1A:
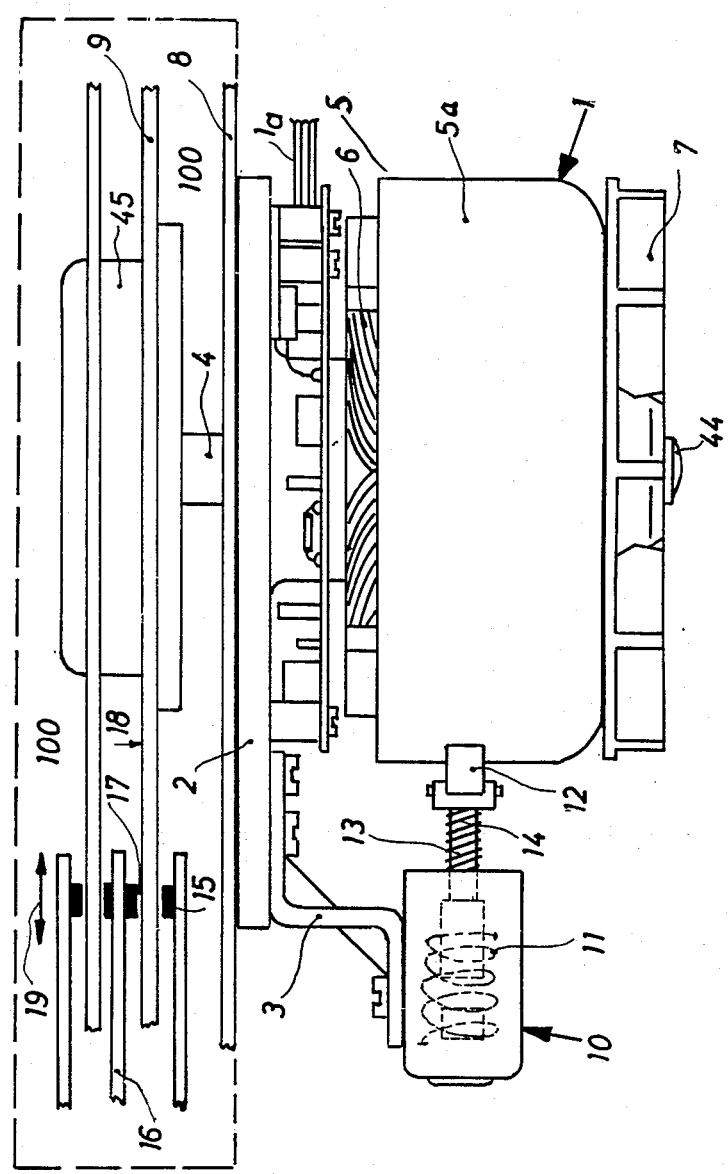
FIG. 1A is a side view, partly in section, of a disk drive embodying the invention, and showing disks and indicating the frame of their surrounding clean room defined by the lower wall of the frame.

Both the method aspects and the apparatus aspects of the invention will hereafter be discussed with reference to the drawing, of which the FIG. 1A shows the drive of a disk-storage device. The actual disk support and the reading and/or writing heads are shown.

A lower wall 8 is a part of the frame of the clean room denoted as 100, the walls of which surround disks 9 with their reading and/or writing heads 15.

Below the lower wall 8 there is a Direct-drive structure 1 of the disks, cooperating with a braking unit 10, both mounted on the wall 8.

The direct-drive structure 1 includes an electric motor 5 which receives its energy via the leads 1a. This motor is, for the present embodiment, illustrated as an external-rotor type, but could also be an internal-rotor of which only the housing 5a is visible, and a stator which is coaxial to the rotor and of which the winding 6 is shown. A drive shaft 4 is connected to the rotor and extends to the disk support which it drive in rotation when motor 5 is energized.

The plane surface of the outside of the bottom of the cup-shaped rotor housing 5a bears an axially adjacent radial fan wheel 7. The housing 5a rotates, connected to the drive shaft 4 at one end 44 of the latter. The disks 9 are supported by a hub 45 which is connected to the drive shaft 4 at its other end.

In rotation, when motor 5 has been energized, the cooperating heads 15 fixed on a voice-coil actuated carrier 16 "float" on a layer of air above the disk as shown in FIG. 1A.

The working direction of the voice-coil motor (which is not shown) is indicated by double-arrow 19.

The information is magnetically recorded on the high-speed rotating disks 9 and is subsequently read out while the disks 9 are rotating. Recording and read-out are effected by the magnetic recording and reading heads 15, respectively. During the actual recording or read-out operation, i.e. when the disk rotates at high speed, these heads 15 "float" on a thin layer of air 17 which is entrained by and above the disk surface 18; due to the presence of this layer 17 the heads 15 do not contact the disk surface 18 under those conditions.

However, the development of the air layer 17 or cushion is a function of the disk speed, V. Before the disk 9 reaches a sufficient speed, or when it drops below this speed, the air layer does not exist and the reading or recording heads 15 can contact the disk surface 18 which they can scratch or otherwise damage. This can be counteracted by reducing the number of disk revolutions according to the invention at run-out.

This happens when the driving torque for the disk(s) is terminated by switching off its drive motor 5 or 20 (which will be mentioned later) through interruption of the leads 1a (or by actuating switch 23 which will be explained in detail below).

Figure 1B:
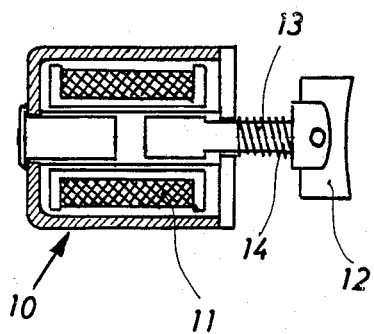
FIG. 1B is an axial cross-section of the braking unit of the disc drive.

Mounted on a flange 2 of the motor 5 is a spacer member 3 which carries, laterally of the rotor housing 5a, a braking unit 10 (shown in FIG. 1B in section). The latter is composed of a solenoid 11 (not shown in detail because known per se), a brake shoe 12 which is turnably mounted on a plunger 13 that can be retracted by operation of the solenoid, and a helical spring 14 surrounding the plunger 13 and bearing upon the solenoid and the brake shoe 12, respectively. The spring 14 normally presses the brake shoe 12 against the surface of the housing 5 of the rotor.

Figure 1C:
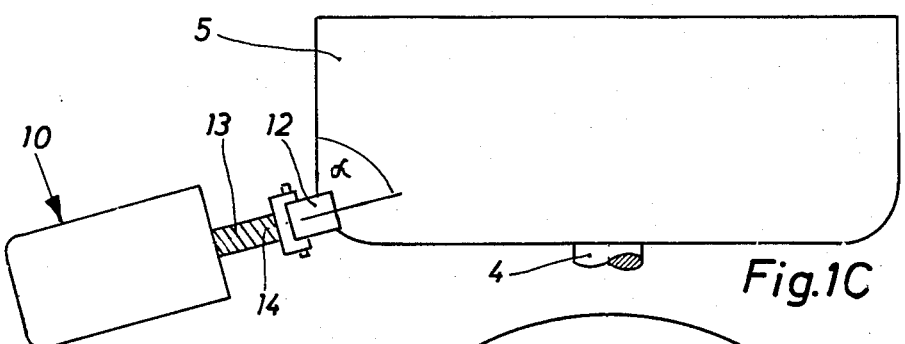
FIGS. 1C and 1D are, respectively, partial side and plan views of the disk drive, illustrating the operation of the braking unit with its power applied at different angles to the axis of rotation of the disk.
Figure 1D:
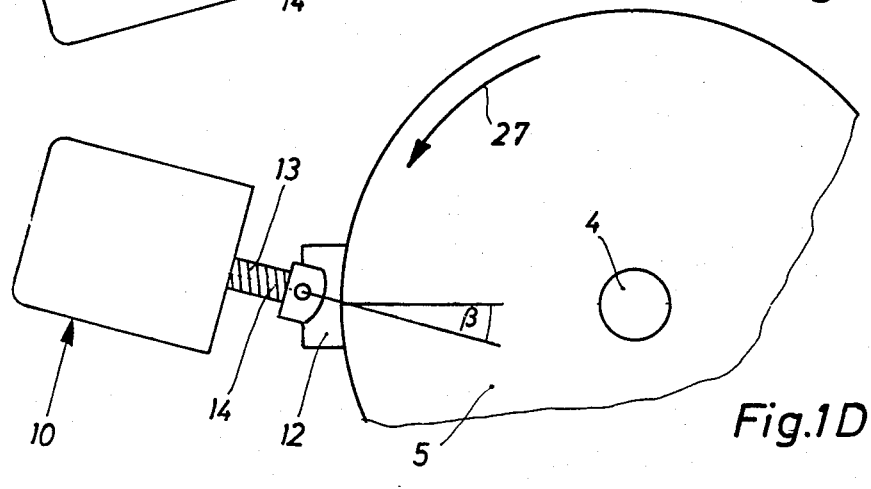

FIG. 1C shows a braking unit 10 cooperating with the rotating housing 5a of an external rotor motor, the axis of its plunger 13 being positioned at an angle $\alpha$ of about 60° to the axis of the drive shaft 4, so applying the braking force at this angle $\alpha$ to the drive shaft 4. FIG. 1D shows the unit 10 positioned at an angle $\beta$ of about 15° to a line extending normal to the axis of the shaft 4 from the center of the braking surface of brake shoe 12.

When the direction of rotation of the rotating housing 5a is opposite to that shown by arrow 27 then occurs a stronger brake effect (braking-force-amplification).

Figure 4:
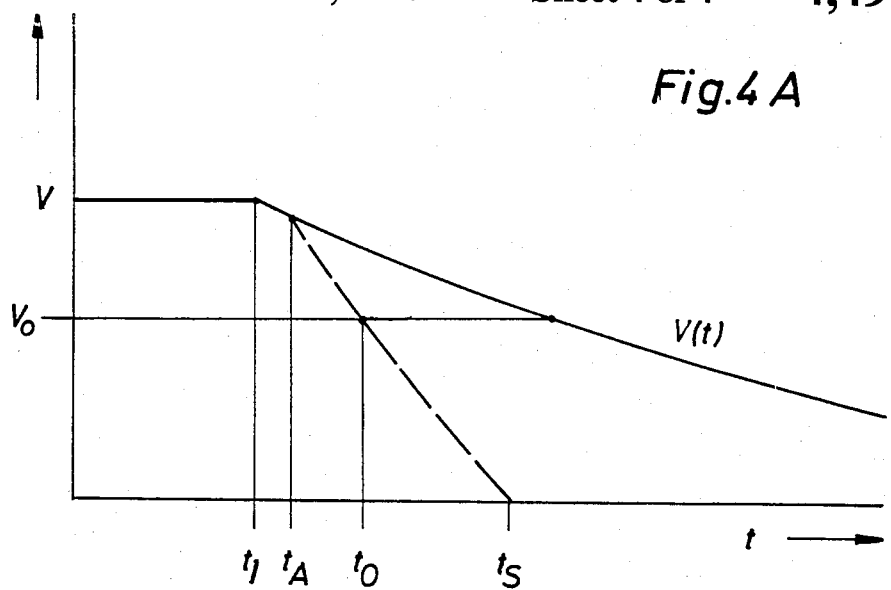
FIGS. 4A and 4B show the time-function during a running-out period of different embodiments of the invention.
Figure 4:
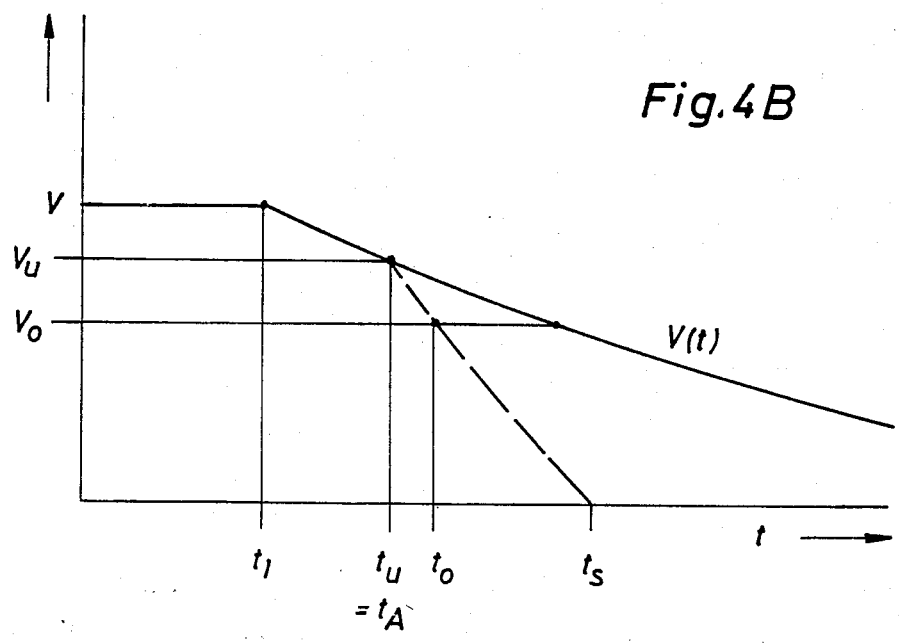

As shown in FIG. 4A when the motor 5 (and the solenoid 11) is deenergized (independently from each other) at time $t_1$ disk speed V goes down as time function V(t). At time $t_o$ the speed has the value $V_o$ and the air layer 17 is destroyed and mechanical contact would occur. Just before that, braking action takes place at time $t_A$ until full stop at time $t_S$.

So, terminating the drive takes place at time $t_1$ and applying a positive braking force to the rotating storage disks takes place during a running-out period of their rotation, especially before contact occurs between a disc and its relevant cooperating head, at time $t_A$ so as to shorten the time which elapses between the step of terminating at time $t_1$ and a full stop of the disk storage at time $t_S$, whereby the contact time between a disk of the disk storage and a magnetic head $t_o - t_s$ thereof is correspondingly reduced.

Figure 2:
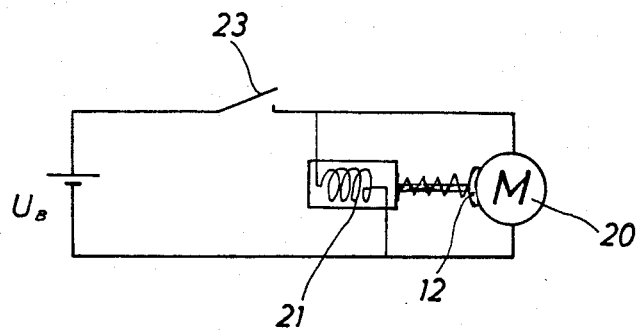
FIG. 2 is a simplified circuit diagram, illustrating the operation of one embodiment of the invention.

The simplified circuit shown in FIG. 2 can be used with the embodiments in FIGS. 1A to 1D. The motor identified as 20 and the solenoid identified as 21 of the brake unit are in circuit with the power supply $U_B$. They can be jointly connected to and disconnected from the power supply by closing of the switch 23 which is interposed in the circuit. When the switch 23 is closed, thereby connecting motor 20 and solenoid 21 to the power supply $U_B$, the solenoid is immediately energized and retracts the brake shoe 12 from the housing 5a (FIG. 1A) under compression of the spring 14. The braking effect is thus instantaneously terminated even while motor 20 receives power, so that the motor 20—and via it the disk 9—can rapidly come up to speed.

When switch 23 is subsequently opened motor 20 and solenoid 21 are electrically disconnected from the power supply $U_B$. However, due to the inertia of the rotor and of the disks 9 with their support 45 (shown in FIG. 1A), the motor 20 continues to rotate. Running in this fashion, the motor acts as a generator and the voltage induced as a result of this is sufficient to hold the solenoid in its energized position; only when the motor RPM at a time $t_u$ (FIG. 4B) drops below a certain level Vu will the induced current become too weak to hold the solenoid, and the spring 14 then urges the shoe 12 back into contact with the housing 5a. In other words: there is a time delay $t_u - t_1$ between the opening of switch 23 and the engagement of shoe 12 with housing 5a (Compare FIG. 4B). The magnitude of this time delay $t_u - t_1$ can be selected by appropriate dimensioning of the spring 14 and solenoid 21, so that the braking action begins at time $t_u = t_A$ while the recording and/or reading heads 15 are still supported on the air cushion above the disk, i.e. before a head touches its disk surface at time $t_o$. Of course, the selection can be made otherwise, for example for the braking to take effect only after the heads have moved to the disk margin when no information is recorded and where contact between disk and head is therefore not objectionable. It is also conceivable to have the braking action take place in such a manner that the heads travel in the direction of arrows 19 (during start-up and shut down) over the entire recorded area of the disk thus spreading the contact area over the entire disk surface instead of concentrating the wear on a single track of the disk.

Figure 3:
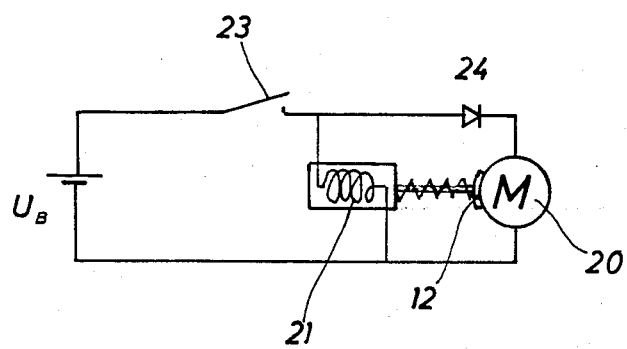
FIG. 3 is a view similar to FIG. 2 but illustrating the operation of another embodiment of the invention.

The circuit in FIG. 3 can also be used in the embodiment of FIG. 1A. It differs from FIG. 2 only in the addition of a diode 24 which is interposed in the circuit between the motor 20 and the solenoid 21. When the switch 23 is closed in this embodiment, the motor supply current flows through the diode 24. When the switch 23 is opened the motor and solenoid are again disconnected from the source $U_B$, just as in FIG. 2. This time, however, the presence of the diode 24 in the circuit prevents the voltage induced by the motor 20 from reaching the solenoid 21. As a result, interruption of the current supply by the switch 23 causes the solenoid 21 to become immediately—(i.e. to at time $t_A$ (in FIG. 4A) de-energized, with the result that braking of the drive (engagement of shoe 12 with housing 5a) starts at once. The diode 24 may, of course, be replaced by a switch, relay or the like. The function time-table of an embodiment according to FIG. 3 is similar to that of FIG. 4A.

In the embodiment shown in FIG. 1A the braking force acts upon the housing 5a in direction normal to the surface thereof—and hence normal to the axis of rotation of shaft 4. However, this is only one possibility and it will be understood that other possibilities exist. As shown in FIG. 1C, the braking force may act at an angle $\alpha$ other than 90° relative to the axis of shaft 4 and the direction may either intersect the axis or be laterally offset from it as shown in FIG. 1D. The force may also act axially offset, i.e. parallel to the axis of shaft 4, or cut an angle α thereto (FIG. 1C). The particular direction of the braking force relative to the axis of shaft 4 may be chosen in case of FIG. 1D by a certain angle β in dependence upon how the braking is to be effected in case of FIG. 1C by a certain angle α and how the motor is mounted in the overall context of the disk drive.

Evidently, the type of brake shown may replaced with another type known per se, for example with a current-reversal brake, an eddy current brake or a DC brake. The brake also need not act on the motor directly; for example, if the shaft 4 is disengagably coupled to a separate drive shaft for the disk support, then the brake may act upon that separate drive shaft or upon the disk support while the drive itself is disengaged therefrom, with the same advantages as outlined above. Even in FIG. 1A the brake need not act upon the housing 5a per se, but could instead act upon a friction surface of some additional component provided generally or for the particular purpose on the rotor. Also, the movement of the solenoid plunger need not be transmitted directly (via shoe 12) to the engagement surface, but could instead be transmitted via a suitable linkage or gear train (known to those skilled in the art).

While the invention has been illustrated and described as embodied in a disk storage drive having an external rotor motor, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fiarly constitute essential characteristics of the generic or specific aspects of this invention.

What is claimed as new and desired to be protected by Letters Patent is set forth in the appended claims:

1. In a digital information-storage apparatus of the type having a read and/or write head which inscribes information bits onto, and/or reads them from, at least one data storage disk which is rotated at high speed relative to such head by means of a rotary disk-holding structure comprised of a disk-support member configured to be accommodated in the large central aperture of such disk for transmitting rotation thereto, the combination with said rotary disk-support member of a motor-brake system, the system comprising an external-rotor motor,
the motor having a stationary part and a rotating part,
the rotating part comprising an axially extending rotor shaft and a rotating cup-shaped rotor housing having an outer surface provided with a braking surface portion,
the stationary part of the motor including a mounting flange which is generally planar and extends normal to the axis of the rotor shaft,
the rotor shaft extending axially in a first direction from the stationary mounting flange to the rotary disk-support member at a first axial side of the mounting flange,
and a brake mounted on the stationary part of the motor and located spaced from the mounting flange in an opposite second axial direction and thus located at the opposite second axial side of the mounting flange,
the brake including a braking part movable into and out of braking engagement with the braking surface portion of the rotor housing.

2. In an apparatus as defined in claim 1, the cup-shaped rotor housing having a first axial end located closer to the stationary mounting flange and a second axial end located remote therefrom, the braking surface portion being located axially intermediate the second axial end and the stationary mounting flange.

3. In an apparatus as defined in claim 1, the cup-shaped rotor housing including a cylindrical housing wall portion and a generally planar bottom wall portion located remote from the stationary mounting flange, the braking surface portion being located on one of said wall portions.

4. In an apparatus as defined in claim 3, the braking surface portion being located on the cylindrical housing wall portion.

5. In an apparatus as defined in claim 3, the braking part being movable in axial direction into braking engagement with the braking surface portion of the rotor housing.

6. In an apparatus as defined in claim 1, the brake being directly secured to the stationary mounting flange.

7. In an apparatus as defined in claim 1, the stationary part of the motor including stator winding means, the brake comprising a biasing spring urging the braking part into braking engagement and solenoid means operative when energized for counteracting the biasing spring, the solenoid means being connected across the stator winding such that when the motor is shut off it acts for a while as a generator maintaining the solenoid means energized for a predetermined time interval.

* * * * *

UNITED STATES PATENT AND TRADEMARK OFFICE
CERTIFICATE OF CORRECTION

PATENT NO. : 4,497,002
DATED : January 29, 1985
INVENTOR(S) : Bernhard Schuh

It is certified that error appears in the above-identified patent and that said Letters Patent is hereby corrected as shown below:

On the title page, between item [19] and item [54], change "von der Heide et al." to --Schuh--.

On the title page, in item [75] change this item from

"[75] Inventors: Johann von der Heide, Mönchweiler; Bernhard Schuh, Georgen, both of Fed. Rep. of Germany"

to: --[75] Inventor: Bernhard Schuh, Baindt, Fed. Rep. of Germany --.

Signed and Sealed this

Sixth Day of May 1986

[SEAL]

Attest:

DONALD J. QUIGG

Attesting Officer

Commissioner of Patents and Trademarks